May 21, 1968 — R. A. HOFFSTADT — 3,384,259

DUAL THERMAL CARRIER

Filed June 23, 1966 — 2 Sheets-Sheet 1

INVENTOR.
Ronald A. Hoffstadt
BY
Murray A. Gleeson
ATTORNEY

INVENTOR.
Ronald A. Hoffstadt
BY
Murray A. Gleeson
ATTORNEY

United States Patent Office 3,384,259
Patented May 21, 1968

3,384,259
DUAL THERMAL CARRIER
Ronald A. Hoffstadt, Springfield, Ill., assignor of one-half to Howard F. Weitecamp, Atwater, Ill.
Filed June 23, 1966, Ser. No. 559,793
10 Claims. (Cl. 220—16)

This invention relates generally to a dual thermal carrier and particularly to a food carrier assembly having two containers which are thermally insulated from one another for the convenient transportation and use of solid or liquid food in either hot or cold condition.

Two-in-one insulated or vacuum style containers are not broadly new. Various kinds of dual insulated food containers have been devise and used, usually arranged in end-to-end relationship, and with a small-mouthed bottle for liquids on top and a wide-mouthed jug or jar on the bottom. These prior dual container food carriers have several drawbacks preventing them from being widely used. They are difficult to take apart and inconvenient to use separately. Often there is no cover or cover latch for the lower container when used separately and in some cases the top container will not stand on its own bottom for separate use.

Further, these prior constructions generally have poor thermal efficiencies, being enclosed in a unitary casing of some kind which requires excessive thicknesses of insulation to block heat transfer across the temperature gradient between hot and cold compartments. And the casing is closed, allowing steam and moisture to collect between the compartments, aggravating heat loss from a hot to a cold compartment.

A principal object of the present invention is to provide a dual thermal carrier which has a high thermal efficiency and is convertible by quick release clamp means into two separate insulated containers each of which is capable of standing on its own base with its own cover secured on it and adapted to be readily passed about a picnic table or camp site without significantly affecting the hot or cold condition of the food inside.

An important object of the present invention is to improve thermal efficiency where the two containers carry hot and cold foods respectively. Heat passes through wet surfaces much more readily than through dry surfaces; it is therefore an important part of this invention to maintain a dry, ventilated zone between the two compartments of the dual assembly.

A specific object of the present invention is to provide a dual thermal carrier in which two insulated containers are assembled in piggy-back relation, providing a space or zone between the top container and the lower cover, and, further, providing apertures in the assembly enabling through-ventilation of said space or zone with ambient air.

This improves thermal efficiency in the following two ways:

*First.*—It keeps the adjacent, facing portions of the two containers dry, free of steam and moisture build-up, thereby greatly reducing the heat transfer rate; and

*Second.*—By limiting the temperature *gradient* to that existing between either compartment and ambient air in the ventilating zone, loss of heat from the hot container into the cold container is less than would otherwise occur if the zone were not ventilated and the full temperature gradient between hot and cold containers were allowed to drive heat from one to the other.

Another object of the present invention is the provision, in a dual thermal carrier having an upper container and a lower container, of dual function quick release clamp means having a first selective locked condition for clamping the two containers in a unitary assembly with the lower cover sealed against the lower container; and a second selective locked condition in which the lower cover is sealed against the lower container independent of the upper container, enabling the two containers to be used separately, completely independent of each other when desired.

Other objects and advantages will be apparent from the following description and the accompanying drawings in which.

Like parts are referred to by like reference characters throughout the figures of the drawings.

Figure 1:
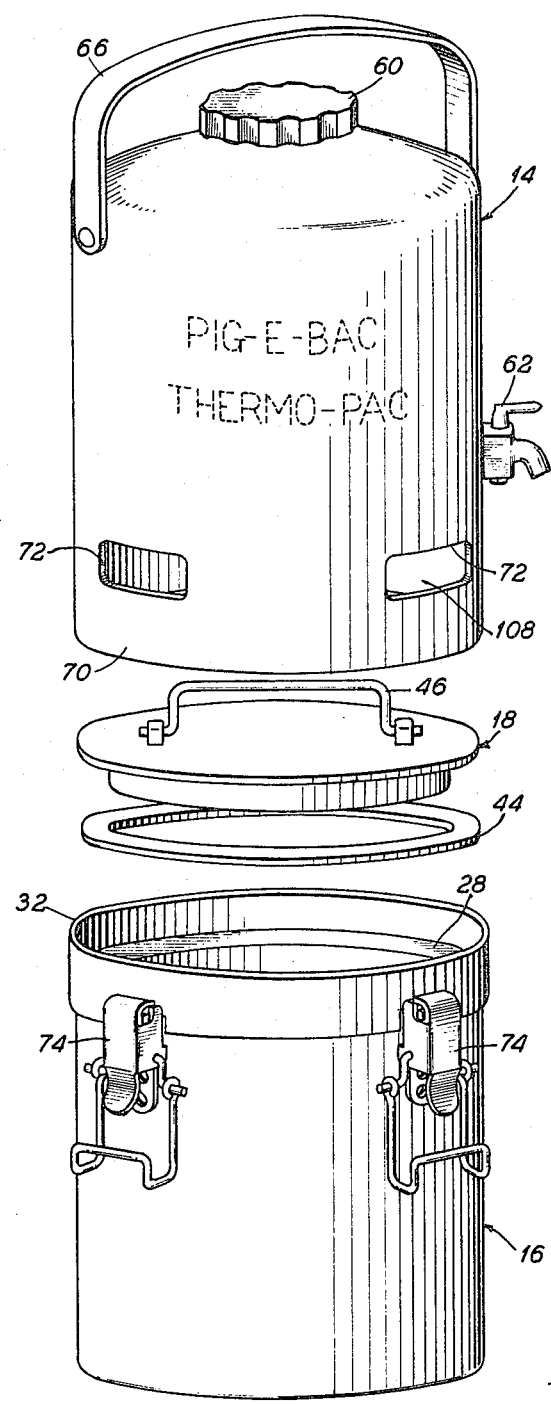
FIGURE 1 is an exploded perspective view of a preferred form of the invention.

Referring now to the drawings, the dual thermal carrier is generally designated 12 and comprises an upper container 14 and a lower container 16 having a cover 18.

The lower container comprises an inner shell 20 and an outer shell 22 with a sealed space 24 therebetween filled with thermal insulating material such as formed or fibrous plastics or glass 26. In the present embodiment, the inner and outer shells are shown as metal but, alternatively, either or both may be made of plastics, this also being true for the walls of the upper container 14 and the cover 18.

In the present embodiment, the inner and outer shells 20 and 22 are bridged by an annular seat 28 encircling a wide-mouthed upper opening 30. The outer shell has an upper retaining or guide lip 32 which in this case is short cylindrical section fixed as by spot welding or adhesive to the upper portion of outer wall 22. As will be seen, the lip 32 functions as a guide for the upper container 14 and the lower cover 18.

The cover is fabricated with an upper circular wall 34 and a lower circular wall 36 with a sealed space 38 therebetween filled with thermal insulation 26. The cover lower wall 36 has a tubular section 40 and an annular seat section 42 welded or crimped around its periphery to the upper wall 34. An annular rubberlike gasket 44 provides a seal between the cover 18 and wide-mouth seat 28 in both configurations shown in FIGS. 2 and 3.

A metal or plastics bail or handle 46 is mounted on the top of the cover 18 by a pair of swivel eyes 48, 48. It is shown in folded-down position in FIGS. 2 and 4, and upright, for carrying the lower container separately, in FIG. 3.

The upper container 14 has inner and outer shells 50 and 52 enclosing a sealed space 54 filled with thermal insulation 26. The shells 50 and 52 are bridged at the top central portion by a vertical tube section 56 having an upper threaded portion 58 to which a cap 60 is screw-connected. The latter will preferably be of plastics or other low heat conductive material.

A spigot of some suitable form will preferably be used on the upper container to facilitate withdrawal of liquids. By way of example, the spigot 62 is shown, communicating with the interior through a tube 64 extending through the walls 50, 52.

Figure 2:
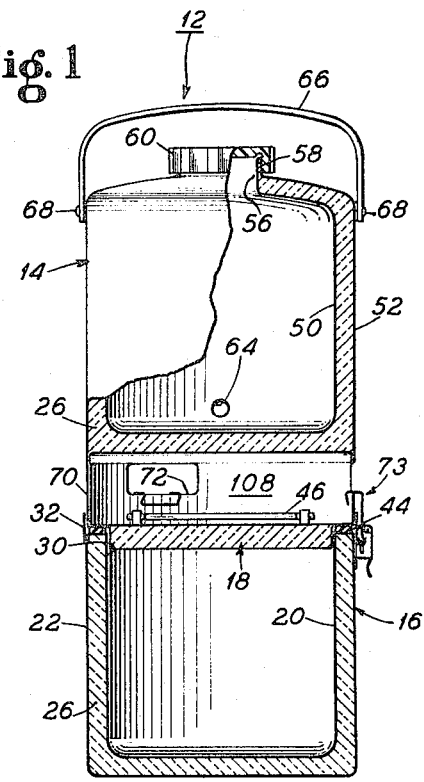
FIG. 2 is a partial, upright, cross-sectional view of FIG. 1 showing the dual thermal carrier assembled for carrying as a single unit.
Figure 3:
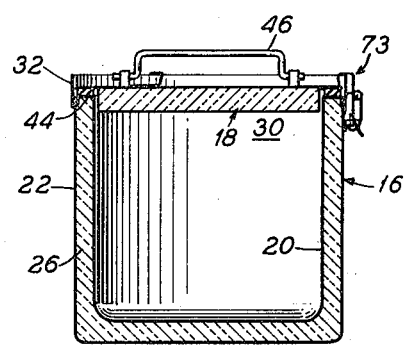
FIG. 3 is a view of a portion of the FIG. 1 and 2 assembly, showing the lower container adapted for separate use independent of the upper container.

A main carrying bail 66 of metal or plastics is trunnioned on a pair of headed pins or bolts 68 oppositely disposed on the outer shell 52. This provides a convenient carrying handle for the entire dual assembly as shown in FIG. 2, or for the upper container alone.

Figure 4:
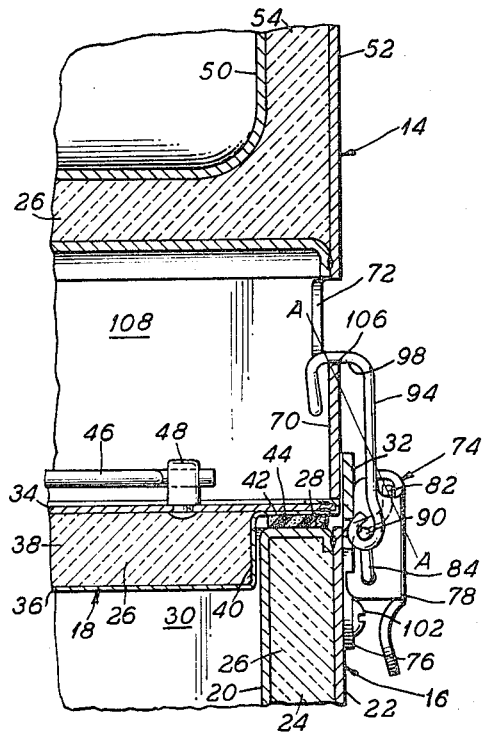
FIG. 4 is an enlarged, fragmentary view of FIG. 2 showing details of the improved quick release clamp means in a first locked condition.

The outer shell of the upper container is formed with a depending, annular skirt 70 having several, in this case three, apertures 72 circumferentially spaced around it. When dual assembled, as shown in FIGS. 2 and 4, the bottom of the skirt rests on the top of cover 18. Thus, when the containers are clamped together, the gasket 44 is pressed between the cover 18 and the seat 28.

Clamp means, generally designated 73, is provided to hold the two containers 14 and 16 in a unitary assembly with the lower cover sealed against the lower container; and, alternatively, to hold the cover on the lower container when the latter is carried independently.

The clamp means comprises a plurality of, in this case three, clamps 74, each including a mounting bracket 76 affixed as by screws to the outside of the lower container. A manually operable lever 78 has a pair of openings 80 pivoted on bracket lugs 82. A double crank pin 84 is mounted with its central portion 86 journaled in a pair of holes 88 in opposite sides of the lever. Crank pins 90, are carried by lever portions 92 and are offset eccentrically from the central portion 86 to an extent determined by the length of lever portions 92. A formed wire compression hook 94 comprises a pair of link sections 96 pivotally engaged with the crank pins 90 and terminating at their opposite ends in bights 98 connected by crossbar 100. The clamp is assembled as shown in FIGS. 4–7 and mounted on the outside over the lower container as by screws 102 extending through bracket holes 104.

Each clamp 74 has a first locked condition as shown in FIG. 4 in which the bight 98 engages the skirt 70 at the lower edge 106 of the corresponding aperture 72. In this condition, the crank pins 90 are "up," as shown. Downward movement of the manual lever 78 draws the skirt down upon the cover 18, compressing the gasket 44 against the seat 28. In this first locked condition, the clamp is in a stable, overcenter position, with the lever 78 resting against the lower container, and with crank pin 90 inside the line A—A connecting edge 106 and lug 82 (FIG. 4).

Figure 5:
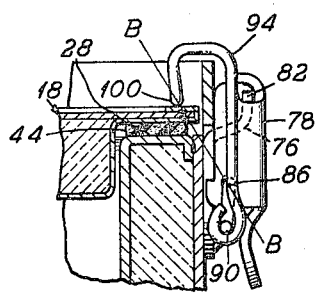
FIG. 5 is an enlarged, fragmentary view of FIG. 3 showing details of the clamp means in a second locked condition.
Figure 6:
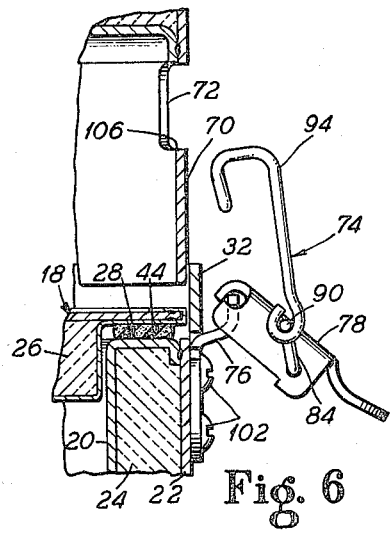
FIG. 6 is a view similar to FIG. 4 showing the clamp means in a released condition.
Figure 7:
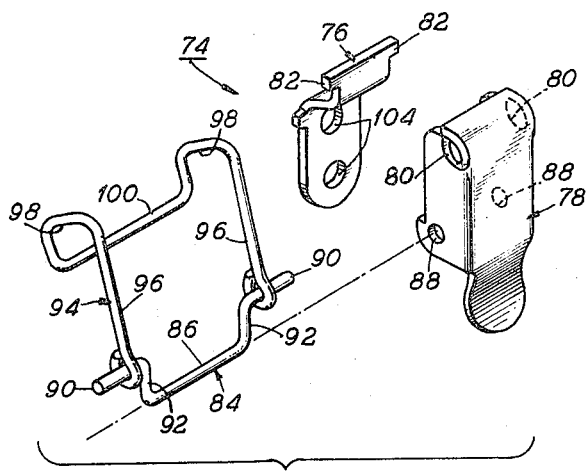
FIG. 7 is an exploded perspective view of a portion of one of the clamp means.

Each clamp 74 has a second locked condition as shown in FIG. 5 in which the cross-bar 100 engages the cover 18 and presses it directly down upon the gasket. In this condition, the crank pins 90 are "down." Downward movement of the manual lever 78 to touch the lower container puts it into a second stable overcenter position where crank pin 90 is inside the line B—B connecting the cross-bar 100 and the central crank portion 86.

In both the FIG. 4 and FIG. 5 locked conditions, it is essential that there be some energy-storing elasticity between the clamp means and the lower container to maintain the overcenter conditions stable. Preferably this should comprise an elastic element which is equally effective in both the FIG. 4 and FIG. 5 conditions. In the present design, this is primarily the elasticity in the rubberlike gasket 44 itself. Uniform compression in both locked conditions is obtained by making the bight 98 engage the edge 106 (FIG. 4) and making the cross bar 100 engage the cover 18 (FIG. 5) *at the same angular position of the lever 78.*

An important feature of the present invention is the zone or space 108 inside the skirt 70 between the two containers, coupled with the apertures 72 which provide uninterrupted through-ventilation of that zone with ambient, atmospheric air. This improves thermal efficiency in the two ways heretofore mentioned, namely by keeping the zone dry, and by limiting the temperature gradient to that existing between the temperature in either container and the ambient temperature in the said ventilating zone.

By employing a *series* of apertures 72 around the zone 108, through-ventilation is obtained by ordinary ambient convection currents augmented by movement of the unit itself as it is carried. This effectively dissipates any moisture leaking past the lower cover, or remaining after the unit is washed and sterilized prior to use, or collected on the bottom of the upper container when resting on the ground.

Normally, the coldest foods carried in one container would be frozen foods or ice cream, possibly as cold as minus 20° F. And the hottest might be something like coffee or soup, as high as plus 200° F. Without the ventilated zone 108 between the two containers, there would be a heat transfer bridge between the containers within the assembly, and this condition would of course be aggravated if moisture were present, enabling heat from the coffee to leak into the ice cream under the driving force of a 220° F. temperature gradient. By contrast, with the ventilated zone 108 of the present invention at, say, an ambient temperature of 90° F., the temperature gradient between each food zone and the ambient would be halved, namely 110° F. The dryness of the zone further reduces unwanted heat transfer.

From the foregoing description, it is believed that use and operation of the dual thermal carrier will be readily apparent.

To use it as a dual assembly, as shown in FIG. 2, the upper and lower containers will be filled individually, one with hot food, one with cold, or both hot, or both cold. The top cover 60 will be screwed on. The bottom cover 18 and gasket 44 will be placed on the seat 28, following which the top container will be set with the skirt 70 within the upstanding lip 32. When the clamp hooks 94 are inserted through the ventilating apertures 72 and the clamp levers 78 snapped down overcenter, the dual assembly of FIG. 2 is tight and ready to be carried by the bail 66.

At the point of use, for example, a picnic, or at a construction site where a workman takes his dinner, the upper and lower containers can be taken apart and used separately, each resting on its own base, and each having its individual, tight cover to keep the hot foods hot and the cold foods cold.

Alternatively, each of the upper and lower containers can be used individually as desired. If the lower container is used separately, the cover will be clamped and sealed as shown in FIG. 5.

While the upper and lower containers and the lower cover have been described as comprising double-walled metal or plastics construction with thermal insulation between them, it will be obvious to one skilled in the art that other construction materials may be used, for example, each of these parts may be made of one-piece rigid foamed plastic materials for economy and light weight.

While one form in which the present invention may be embodied has been shown and described it will be understood that various modifications may be made within the spirit and scope of the invention as defined by the appended claims.

I claim:
1. A dual thermal carrier comprising:
upper and lower thermally insulated containers;
cover means for an upper opening in the lower container;
the upper container being seated on the cover means and having its bottom portion spaced from the cover to provide a ventilating zone between the containers;
at least one of the containers having a plurality of apertures spaced about the periphery and providing ventilating communication between the zone and ambient air to maintain the zone dry and at ambient temperature responsive to movement of the carrier and convection air currents;
releasable clamp means between the containers being operable to and from a first locked condition effective to hold the containers together as a unitary car- rier while concurrently pressing the cover means onto the lower container.

2. The structure of claim 1 in which said clamp means is operable to and from a second locked condition effective to clamp said cover means on said lower container independent of said upper container, whereby the two containers may be used as separate units independent of each other.

3. The structure of claim 2 in which each of said clamp means comprises a lever pivoted on one of said containers, and a hook having one end pivoted to the lever and another end selectively engageable with said other container or said cover means.

4. The structure of claim 3 in which said hook is selectively pivotable at different positions on said lever corresponding to one or the other of said first and second locked conditions.

5. The structure of claim 4 in which said hook is pivoted on an eccentric portion of a crank pin pivoted on said lever.

6. The structure of claim 1 in which said upper container has a depending, peripheral skirt surrounding said ventilating zone, the skirt having said apertures formed therein and being engageable with said cover means.

7. The structure of claim 2 in which said upper container has a depending, peripheral skirt surrounding said ventilating zone, the skirt having apertures formed therein and being engageable with said cover means, said clamp means being mounted on said lower container and respectively engageable, in said first and second locked conditions, with said skirt and with said cover means.

8. The structure of claim 1 in which an elastic element is provided between said clamp means and said lower container for storing energy in said first locked condition to maintain said cover means compressed against said lower container.

9. The structure of claim 8 in which said elastic element comprises a rubberlike gasket between said cover means and said lower container.

10. The structure of claim 1 in which said lower container has an annular seat surrounding said opening adjacent the periphery of said lower container and an upper, annular lip on said lower container surrounding the seat and surrounding and guiding a lower portion of said upper container to maintain the container in alignment.

References Cited

UNITED STATES PATENTS

| | | |
|---|---|---|
| 2,080,923 | 5/1937 | Lassen. |
| 2,184,336 | 12/1939 | Devine _____ 206—4 |
| 2,371,578 | 3/1945 | Badger et al. _____ 220—16 X |
| 2,462,461 | 2/1949 | Bird _____ 220—16 X |

THERON E. CONDON, *Primary Examiner.*

JAMES R. GARRETT, *Examiner.*